United States Patent

Haruch

[11] Patent Number: 5,921,472
[45] Date of Patent: Jul. 13, 1999

[54] ENHANCED EFFICIENCY NOZZLE FOR USE IN FLUIDIZED CATALYTIC CRACKING

[75] Inventor: James Haruch, Naperville, Ill.

[73] Assignee: Spraying Systems Co., Wheaton, Ill.

[21] Appl. No.: 08/550,163

[22] Filed: Oct. 30, 1995

Related U.S. Application Data

[63] Continuation-in-part of application No. 08/354,614, Dec. 13, 1994, Pat. No. 5,673,859.

[51] Int. Cl.$^6$ ........................................................ B05B 7/04
[52] U.S. Cl. .............................................................. 239/432
[58] Field of Search ................................... 239/432, 543, 239/433, 434, 428

[56] References Cited

U.S. PATENT DOCUMENTS

| | | | |
|---|---|---|---|
| 4,349,156 | 9/1982 | Haruch | 239/432 |
| 4,591,099 | 5/1986 | Emory et al. | 239/432 |
| 4,815,665 | 3/1989 | Haruch | 239/432 |
| 5,306,418 | 4/1994 | Dou et al. | 239/432 |

FOREIGN PATENT DOCUMENTS 0 454 416 A2  10/1991  European Pat. Off. .

*Primary Examiner*—Matthew C. Graham
*Attorney, Agent, or Firm*—Leydig, Voit & Mayer, Ltd.

[57] ABSTRACT

In fluidized catalytic cracking, enhanced efficiency is produced through the use of a spray nozzle having two transversely elongated discharge orifices for effecting fine atomization of liquid hydrocarbon feed as the latter is sprayed from the nozzle. The orifices preferably are inclined so as to produce a converging spray but can be inclined to produce a diverging spray or a substantially flat spray. Alternative forms of pressurized air atomizing heads are disclosed.

19 Claims, 2 Drawing Sheets

ENHANCED EFFICIENCY NOZZLE FOR USE IN FLUIDIZED CATALYTIC CRACKING

CROSS-REFERENCE TO RELATED APPLICATIONS

This application is a continuation-in-part of U.S. application Ser. No. 08/354,614, filed Dec. 13, 1994, now U.S. Pat. No. 5,637,859.

BACKGROUND OF THE INVENTION

This invention relates generally to atomizing and spraying apparatus and, more particularly, to apparatus for atomizing liquid feed to a fluidized catalytic cracking riser reactor.

Apparatus of this general type is shown and described in detail in Dou et al. U.S. Pat. No. 5,306,418, the disclosure of which is incorporated herein by reference. In general, a liquid hydrocarbon feed is atomized by a gas such as steam and is discharged through a nozzle into the reactor. In the apparatus of the Dou et al patent, the preferred discharge nozzle has a generally hemispherical discharge end which is formed with a single elongated slot-like outlet orifice adapted to produce a flat fan-shaped spray.

A goal in atomizing and spraying apparatus is to achieve high efficiency. High efficiency in the context of the present apparatus refers to using as little steam energy as possible to break hydrocarbon feed of a given volume into particles having a large total surface area. Large surface areas are, of course, created by breaking the liquid into very fine particles. Heretofore, this has necessitated introducing the liquid hydrocarbon flow stream into the nozzle apparatus at relatively high pressure, such as on the order of 150 psi to 200 psi. This sometimes has required that the refinery use booster pumps and associated equipment in order to achieve the necessary pressurization of the liquid flow stream, which can be costly and add to the complexity of the spraying system.

SUMMARY OF THE INVENTION

The general aim of the present invention is to provide a new and improved nozzle of comparatively high efficiency for use in the fluidized catalytic cracking of hydrocarbon liquid.

A more detailed object of the invention is to achieve the foregoing through the provision of a nozzle having a plurality of slot-like outlets which atomize the liquid into finer particles as the liquid is discharged from the nozzle.

A further object is to angle the slot-like outlets relative to one another in such a manner as to produce a converging spray which itself effects post-discharge atomization of the liquid particles.

Another object is to provide a fluidized catalytic cracking nozzle apparatus with improved liquid pre-atomizing means which enables high efficiency atomization and spraying at substantially lower liquid feed pressures than heretofore possible.

These and other objects and advantages of the invention will become more apparent from the following detailed description when taken in conjunction with the accompanying drawings.

Figure 1:
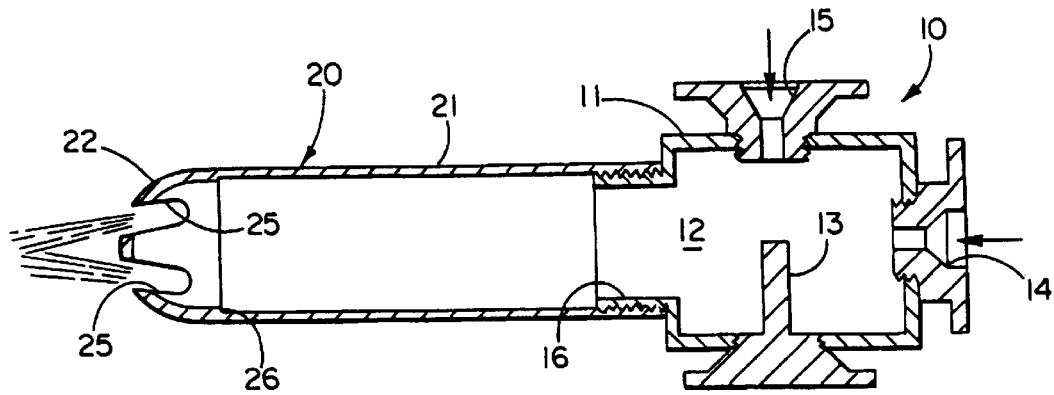
FIG. 1 is a cross-sectional view taken axially through catalytic cracking atomizing and spraying apparatus equipped with a new and improved nozzle incorporating the unique features of the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as incorporated in apparatus 10 for atomizing and spraying liquid. The apparatus is particularly useful for use in a fluidic catalytic cracking process for atomizing a liquid hydrocarbon feed injected into an FCC riser reactor 19. The aforementioned Dou et al patent contains a detailed disclosure of the use, in an FCC riser reactor, of apparatus of the same general type as the present apparatus.

In general, the apparatus 10 includes means for atomizing the liquid feed with a stream of gas which preferably is steam. Herein, the atomizing means are of the same general type as disclosed in Haruch et al U.S. Pat. No. 4,349,156. Such means are shown somewhat schematically in FIG. 1 and comprise an atomizing head having a body 11 defining an internal pre-atomizing chamber 12. An elongated impingement pin 13 is located in the chamber with its end positioned approximately at the center of the chamber. Pressurized liquid feed, preferably at a pressure of between about 150 psi to 200 psi, is introduced into the chamber via an inlet port 15 in the body 11, which is disposed in spaced opposing relation with the end of the pin 13. The stream of liquid impinges against an end surface of impingement pin and is mechanically shattered into small droplets. At the same time, a pressurized jet of steam is introduced into the chamber by way of an inlet port 15 and is directed transversely across and about the end of the pin, striking the liquid droplets splashing off of the pin to cause the liquid droplets to be further atomized into fine particles.

Attached to the body 11 and located downstream of the outlet 16 of the chamber 12 is a nozzle 20 for spraying the atomized liquid feed and the entrained steam into the reactor. Herein, the nozzle includes an elongated and generally cylindrical body 21 having a downstream end 22 which defines a discharge end. The discharge end 22 of the nozzle is generally hemispherical and thus includes a convex outer surface and a concave inner surface. Such surfaces conform generally in shape to the shape of a section of a sphere having a geometric center lying on the longitudinal axis of the body 21 of the nozzle 20. The spherical section defines a nozzle chamber sized smaller than the diameter of the cylindrical body 21.

In accordance with the present invention, the discharge end 22 of the nozzle 20 is formed with a plurality of discharge orifices 25 which are located on opposite sides of the axis of the nozzle and which are elongated in a direction extending transversely of the axis. By virtue of the discharge end of the nozzle having a plurality of outlet orifices, the mixture discharged from the nozzle is atomized more finely than is the case of a nozzle having a single discharge orifice of comparable area centered on the axis of the nozzle. As a result of the finer atomization effected by the multiple orifices, the efficiency of the apparatus 10 is increased in that a given volume of liquid may be broken into particles having a relatively high surface area even though steam is supplied to the apparatus at a comparatively low volumetric flow rate.

Figure 2:
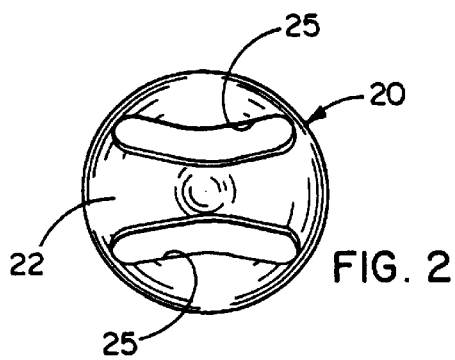
FIG. 2 is an enlarged end view of the nozzle shown in FIG. 1.

In the embodiment of FIGS. 1 and 2, two elongated outlet orifices 25 are formed in the discharge end 22 of the nozzle 20. The orifices are located on opposite sides of and are spaced equidistantly from the axis of the nozzle and, as pointed out above, are elongated in a direction extending transversely of the nozzle. FIGS. 1 and 2 represent one embodiment in which, the orifices 25 are angled toward one another so as to cause the streams sprayed from the nozzle to converge upon progressing away from the discharge end of the nozzle. In this way, the streams impact against one another to effect still further atomization immediately outside the nozzle. Each orifice preferably is inclined at an angle up to about ten degrees relative to the axis of the nozzle.

The discharge orifices 25 may be formed in the discharge end 22 of the nozzle 20 by a milling cutter. Because of the hemispherical shape of the discharge end, slotting of the discharge end with a milling cutter inclined at an angle up to about ten degrees causes the upper orifice to appear generally V-shaped and to cause the lower orifice to appear generally as an inverted V when the orifices are viewed from the end of the nozzle as in FIG. 2.

Further efficiency may be imparted to the nozzle by providing a sharp edged annular shoulder 26 at the junction between the body 21 and the discharge end 22. The shoulder is created through the provision of a body whose internal diameter is slightly greater than the internal diameter of the discharge end. The shoulder produces turbulence in the mixture as the mixture approaches the orifices 25 and effects further atomization of the liquid feed.

Figure 4:
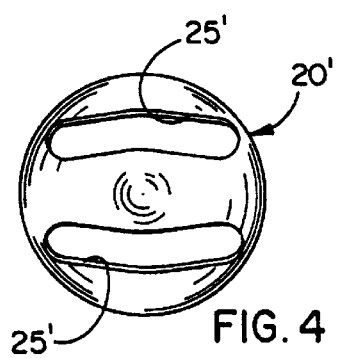
FIG. 4 is an end view of the nozzle shown in FIG. 3.
Figure 3:
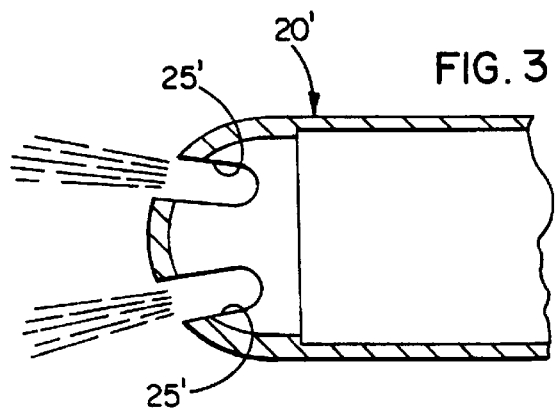
FIG. 3 is an enlarged fragmentary view generally similar to FIG. 1 but shows another embodiment of a nozzle according to the invention.

In the nozzle 20' shown in FIGS. 3 and 4, the orifices 25' are angled such that the streams of atomized liquid discharged through the orifices diverge away from one another upon progressing downstream from the nozzle. This arrangement produces higher efficiency than a nozzle with a single elongated orifice of comparable area but the efficiency is not as great as that achieved with the nozzle 20 of FIGS. 1 and 2.

The following table of data resulting from comparative tests demonstrates the increased efficiency obtained from the nozzle 20' with two diverging orifices 25' when compared to an identical nozzle with a single orifice:

| Nozzle Configuration | Eq. Wt. Steam % | Liquid Pressure (psi) | Steam Pressure (psi) | Sauter Mean Diameter | Volume Median Diameter |
|---|---|---|---|---|---|
| Single Orifice | 3.5 | 50 | 90 | 149 | 198 |
|  | 3.5 | 100 | 90 | 143 | 187 |
|  | 3.5 | 150 | 90 | 141 | 184 |
|  | 3.5 | 200 | 90 | 137 | 178 |
| Double Orifices 10° diverging | 3.26 | 50 | 90 | 133 | 144 |
|  | 3.26 | 100 | 90 | 119 | 128 |
|  | 3.26 | 150 | 90 | 114 | 122 |
|  | 3.0 | 200 | 90 | 111 | 119 |
| Single Orifice | 7.0 | 50 | 90 | 114 | 121 |
|  | 7.0 | 100 | 90 | 113 | 121 |
|  | 7.0 | 150 | 90 | 112 | 120 |
|  | 7.0 | 200 | 90 | 111 | 118 |

In the above table, "Eq. Wt. Steam %" represents the percentage by weight of steam supplied to the apparatus 10 with respect to the weight of supplied liquid based upon the flow rate of the liquid. In carrying out the comparative tests at various liquid pressures, the flow rate of liquid to the apparatus 10 was kept constant at all pressures by progressively decreasing the area of the inlet orifice 15 for progressively increasing pressures.

By comparing the top four rows of data with the middle four rows, it will be apparent that the nozzle 20' with the two diverging orifices 25' effected atomization of the liquid into significantly smaller particles than a nozzle with a single orifice even though the two nozzles were supplied with substantially equal quantities of steam. The enhanced efficiency of the nozzle 20' is demonstrated further by a comparison of the middle four rows of data with the bottom four rows where it will be seen that the nozzle 20' with two diverging orifices 25' achieved substantially the same particle size as a nozzle with a single orifice even though the single-orifice nozzle was supplied with more than twice the quantity of steam.

Figure 6:
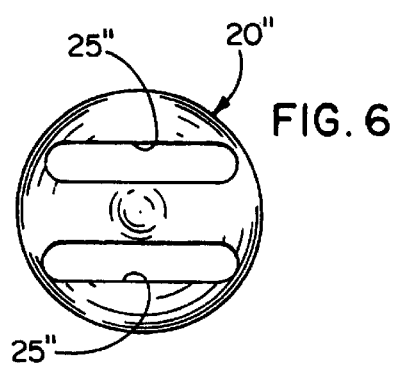
FIGS. 5 and 6 are views similar to FIGS. 3 and 4, respectively, but show yet another embodiment of a nozzle.
Figure 5:
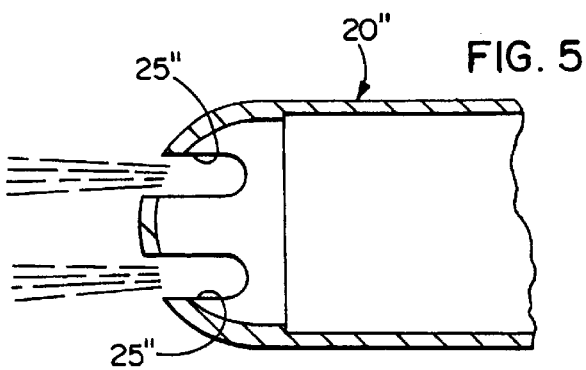

In the nozzle 20" of FIGS. 5 and 6, the two orifices 25" are not angled but instead extend parallel to one another. As a result, parallel streams of atomized liquid tend to be discharged from the orifices. The nozzle 20" is not as efficient as the nozzle 20' but still is more efficient than prior FCC nozzles having a single orifice of comparable area.

Figure 7:
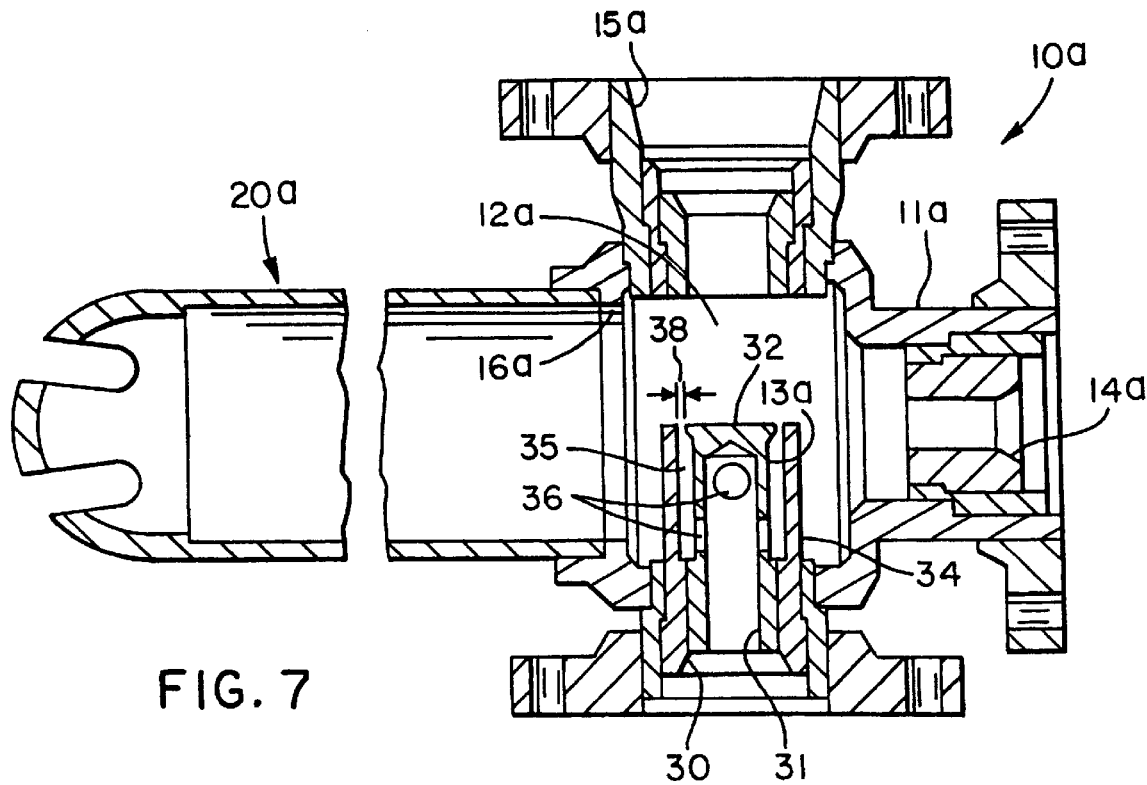
FIG. 7 is a vertical section of a catalytic cracking atomizing and spraying apparatus having an alternative form of pre-atomizing head particularly adapted for high efficiency atomization and spraying of liquid flow streams introduced into the apparatus at relatively lower pressures.

Referring now to FIG. 7, there is shown a catalytic cracking, atomizing and spraying apparatus 10a having an alternative form of atomizing head, particularly adapted for use with liquid flow streams introduced into the apparatus at relatively lower pressures. Items similar to those described above have been given similar reference numerals with the distinguishing suffix "a" added. Like the apparatus 10 illustrated in FIG. 1, the atomizing head has a body 11a which defines an internal chamber 12a having an elongated impingement pin 13 with an end positioned approximately at the center of the chamber. Pressurized liquid feed is introduced into the chamber via an inlet 15a in the body 11a in opposed relation to the end of the pin 13a. At the same time, a pressurized jet of steam is introduced into the chamber from the inlet 14a and assists in breaking down and atomizing the liquid flow stream.

In accordance with a further feature of the invention, in order to enhance atomization of the liquid, even when the liquid flow stream is introduced into the apparatus at relatively low pressures, the atomizing head has an auxiliary gas inlet in close proximity to the impingement pin through which pressurized gas or steam may be directed transversely to the stream of pressurized steam introduced into the chamber from the inlet 14a and in directly opposing relation to the liquid flow stream introduced from the inlet 15a for further breaking down and atomizing the liquid into extremely fine particles.

In the illustrated embodiment, the body 11a of the atomizing head is formed with a second or auxiliary gas or steam inlet port 30, which communicates with an axial passageway 31 formed internally within the impingement pin 13a. The axial passageway 31 extends substantially the length of the impingement pin 13a, but short the end therefor which defines a substantially flat impingement surface 32. The impingement pin 13a in this case is supported in the body 11a by means of an elongated sleeve 34, that extends into the chamber 12a in surrounding relation to the impingement pin 13a and substantially the same distance as the impingement pin. The impingement pin 13a has an outer annular recessed portion which together with an internal surface of the sleeve 34 define an annular passageway 35 about a portion of the pin 13a. The impingement pin 13a is formed with a plurality of axially spaced radial passageways 36 to permit communication of steam from the inlet port 30 through the axial pin passageway 31, through the radial passageway 36, axially along the annular passageway 35 and through a predetermined metering orifice 38 defined between the terminal ends of the sleeve 34 and the impingement pin 13a. Pressurized steam introduced into the inlet port 30 will exit the metering orifice 38 in an outwardly directed annular pattern or sheath about the impingement surface 32.

It has been found that the outer direction of pressurized steam from the metering orifice 38 significantly enhances liquid atomization, even when the liquid is introduced into the atomizing chamber at substantially lowered pressures than heretofore normally required. The apparatus 10a has been found to enable high efficiency atomization of hydrocarbon liquid feed streams when the liquid stream is introduced at pressures as low as 40 to 50 psi, in contrast to the normally required liquid pressure of 150–200 psi. It will be understood by one skilled in the art that elongated tubular nozzles with discharge orifices of various forms, including those specifically disclosed herein, may be utilized with the atomizing head of the apparatus 10a.

Figure 8:
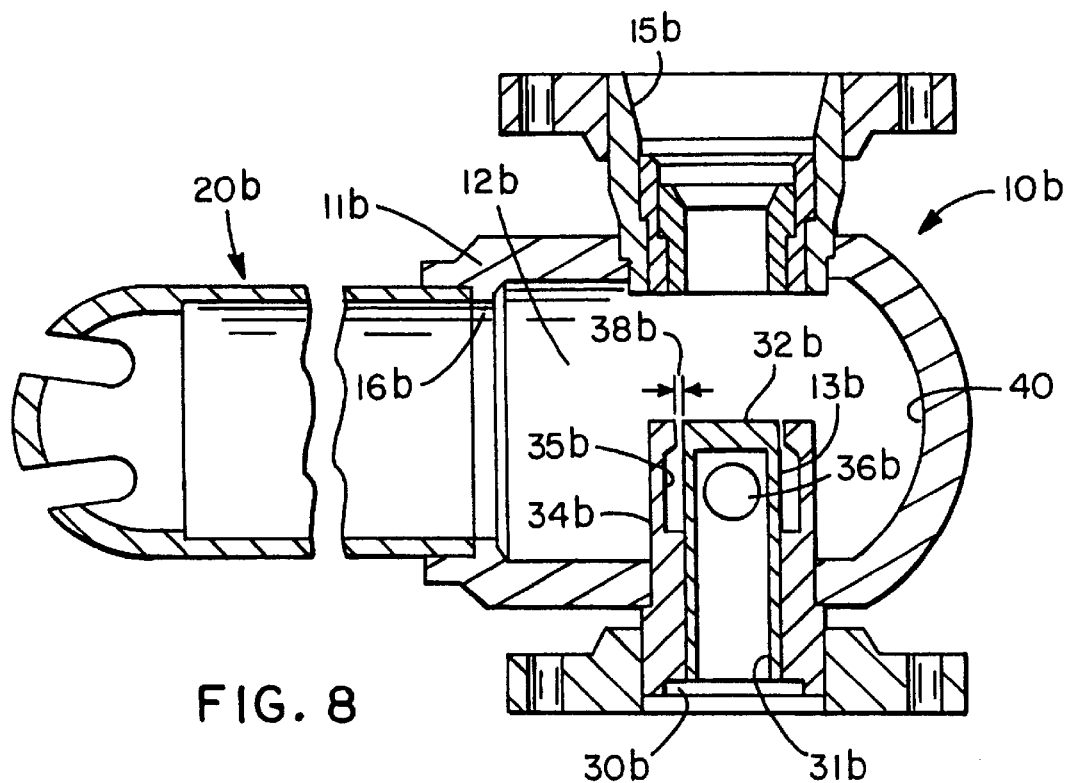
FIG. 8 is a vertical section of a catalytic cracking atomizing and spraying apparatus having another alternative form of pre-atomizing head.

Referring now to FIG. 8, there is shown a catalytic cracking atomizing and spraying apparatus 10b having an alternative form of atomizing head, wherein items similar to those described above have been given similar reference numerals with the distinguishing suffix "b" added. The atomizing head of the apparatus 10b has a hydrocarbon liquid inlet 15b, and an impingement pin 13b with a gas or steam metering orifice 38b substantially similarly to that described in connection with FIG. 7. The annular chamber 35b about the impingement pin 13b in this instance is defined by a recess in the internal surface of the sleeve 34b. Pressurized liquid introduced into the inlet 15b will impinge against the impingement surface 32b of the pin 13b so as to be shattered into small droplets. Simultaneously, a pressurized jet of steam emitted from the annular steam orifice 38b surrounding the impingement surface 32b will strike the liquid droplets splashing off of the pin 13b and forcefully disperse them throughout the mixing and atomizing chamber 12b of the atomizing head body 11b.

In carrying out this embodiment of the invention, the atomizing head chamber 12b has a closed upstream end defined by a concave inner surface 40 adapted to redirect the forcefully dispersed liquid droplets in the chamber in a downstream direction for further interaction with the entering steam and liquid flow streams from the orifice 38b and inlet 15b and for ultimate direction through the nozzle 20b in a form of relatively finely atomized liquid particles. The concave surface 40 in this instance is in the shape of a section of a sphere having a geometric center line on the point of intersection between the longitudinal axis of the cylindrical chamber 12b of the atomizing head and the longitudinal axis of the impingement pin 13b and liquid inlet 15b.

I claim:

1. An apparatus for use in fluidized catalytic cracking of hydrocarbon liquid, said apparatus comprising an atomizing head having an internal mixing and atomizing chamber, an impingement pin mounted in said head and extending into said chamber, said impingement pin defining an impingement surface on an end thereof, said atomizing head having a liquid inlet through which a pressurized liquid stream is directed inwardly into said chamber at an angle to the impingement surface of said impingement pin for impingement against said impingement surface, said atomizing head having a gas inlet through which pressurized gas is directed into said chamber, said gas inlet being in close proximity to said impingement pin for directing said gas outwardly from said impingement surface in a direction generally perpendicular to said impingement surface for interacting with and atomizing liquid introduced into said chamber, said atomizing head having an outlet for said atomized liquid, and a nozzle communicating with said outlet and having a discharge orifice from which atomized liquid is emitted.

2. An apparatus as defined in claim 1 in which said liquid inlet directs said pressurized liquid substantially perpendicularly against said impingement surface.

3. An apparatus as defined in claim 1 in which said nozzle has a tubular body communicating with said atomizing head outlet.

4. An apparatus as defined in claim 1 including a source of pressurized steam, and said atomizing head gas inlet directs pressurized steam from said source into said chamber.

5. An apparatus as defined in claim 4 in which said atomizing head has a second gas inlet through which a pressurized stream of steam may be directed into said chamber and across said impingement surface of the pin.

6. An apparatus as defined in claim 1 in which said atomizing head has a closed upstream end opposite of said outlet.

7. An apparatus as defined in claim 6 in which said upstream end is defined by a concave inner surface for directing liquid in said chamber in a direction toward said outlet and through said nozzle.

8. An apparatus as defined in claim 7 in which said concave surface is in the shape of a section of a sphere having a geometric center line on the point of intersection between an longitudinal axis of said chamber and a longitudinal axis of said impingement pin.

9. An apparatus for use in fluidized catalytic cracking of hydrocarbon liquid, said apparatus comprising an atomizing head having an internal mixing and atomizing chamber, an impingement pin mounted in said head and extending into said chamber, said impingement pin defining an impingement surface on an end thereof, said atomizing head having a liquid inlet through which a pressurized liquid stream is directed inwardly into said chamber at an angle to the impingement surface of said impingement pin for impingement against said impingement surface, said atomizing head having a gas inlet through which pressurized gas is directed into said chamber, said gas inlet being in close proximity to said impingement pin for directing said gas outwardly from said impingement surface in a direction generally opposite to the direction of said pressurized liquid stream for interacting with and atomizing liquid introduced into said chamber, said atomizing head having an outlet for said atomized liquid, and a nozzle communicating with said outlet and having a discharge orifice from which atomized liquid is emitted.

10. An apparatus for use in fluidized catalytic cracking of hydrocarbon liquid, said apparatus comprising an atomizing head having an internal mixing and atomizing chamber and a gas port, an impingement pin mounted in said head and extending into said chamber, said impingement pin defining an impingement surface on an end thereof, said atomizing head having a liquid inlet through which pressurized liquid is directed into said chamber and against the impingement surface of said pin, said atomizing head having a gas inlet in the form of a metering orifice communicating with said gas port through which steam is directed into said chamber, said gas inlet being in close proximity to said impingement pin and configured to admit an annular stream of pressurized steam about the perimeter of said impingement surface in outwardly directed fashion from said impingement surface for interacting with and atomizing liquid introduced into said chamber, said atomizing head having an outlet for said atomized liquid, a nozzle having a tubular body communicating with said outlet, and said nozzle having a discharge orifice adjacent an outer end thereof from which atomized liquid is emitted.

11. An apparatus for use in fluidized catalytic cracking of hydrocarbon liquid, said apparatus comprising an atomizing head having an internal mixing and atomizing chamber and a gas port, an impingement pin mounted in said head and extending into said chamber, said impingement pin defining an impingement surface on an end thereof, said atomizing head having a liquid inlet through which pressurized liquid is directed into said chamber and against the impingement surface of said pin, said pin being formed with an axial passageway communicating with said gas port and a further passageway communicating between said axial passageway and a gas inlet in the form of a metering orifice through which steam is directed into said chamber, said metering orifice being in close proximity to said impingement pin for directing said steam in a direction outwardly from said impingement surface for interacting with and atomizing liquid introduced into said chamber, said atomizing head having a second gas inlet through which a pressurized stream of steam is directed into said chamber and across said impingement surface of the pin, said atomizing head having an outlet for said atomized liquid, a nozzle having a tubular body communicating with said outlet, and said nozzle having a discharge orifice adjacent an outer end therof from which atomized liquid is emitted.

12. An apparatus as defined in claim 11 in which said further passageway includes at least one radial passageway communicating with said axial passageway, and an annular passageway communicating between said radial passageway and said metering orifice.

13. An apparatus as defined in claim 2 in which said atomizing head has an annular sleeve mounted in surrounding relation to said pin.

14. An apparatus as defined in claim 13 in which said annular passageway is defined between an outer periphery of said pin and an inner surface of said sleeve.

15. An apparatus as defined in claim 13 in which said pin is mounted within said sleeve.

16. An apparatus as defined in claim 13 in which said metering orifice is defined between terminal ends of said pin and sleeve.

17. An apparatus for use in fluidized catalytic cracking of hydrocarbon liquid, said apparatus comprising an atomizing head having an internal mixing and atomizing chamber an impingement pin mounted in said head and extending into said chamber, said atomizing head having a liquid inlet through which a stream of pressurized liquid is introduced into said chamber in the direction of said pin, said atomizing head having a gas inlet through which a pressurized stream of steam is introduced into said chamber and in the direction of said pin for interactin with and atomizing liquid introduced into said chamber, said atomizing head having an auxiliary gas inlet in the form of a metering orifice configured to admit an annular stream of pressurized steam form a perimeter of said impingement pin into said chamber in a direction outwardly from an end of said pin for further atomizing liquid introduced into said chamber, said atomizing head having an outlet for said atomized liquid, and a nozzle communicating with outlet and having a discharge orifice from which the atomized liquid is emitted.

18. An apparatus as defined in claim 17 in which said atomizing head has an annular sleeve mounted in surrounding relation to said pin, said metering orifice being defined between terminal ends of said pin and sleeve.

19. An apparatus as defined in claim 18 in which the end of said pin defines a liquid impingement surface, and said metering orifice is disposed about said impingement surface.

\* \* \* \* \*